(12) United States Patent
Zhu et al.

(10) Patent No.: US 8,885,547 B2
(45) Date of Patent: Nov. 11, 2014

(54) POWER-EFFICIENT MEDIA ACCESS TECHNIQUES FOR WIRELESS NETWORKS

(75) Inventors: Jing Zhu, Portland, OR (US); Adrian Stephens, Cambridge (GB); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1272 days.

(21) Appl. No.: 12/317,506

(22) Filed: Dec. 22, 2008

(65) Prior Publication Data

US 2010/0157971 A1 Jun. 24, 2010

(51) Int. Cl.
*H04B 7/185* (2006.01)
*H04L 12/413* (2006.01)
*H04W 74/08* (2009.01)
*H04W 48/02* (2009.01)

(52) U.S. Cl.
CPC ............. *H04L 12/413* (2013.01); *H04W 48/02* (2013.01); *H04W 74/0816* (2013.01); *Y02B 60/50* (2013.01)
USPC .......................................... 370/318; 370/445

(58) Field of Classification Search
USPC .......................................................... 370/318
See application file for complete search history.

(56) References Cited

U.S. PATENT DOCUMENTS

| | | | |
|---|---|---|---|
| 6,418,136 B1 * | 7/2002 | Naor et al. .................... | 370/347 |
| 7,016,296 B2 * | 3/2006 | Hartman, Jr. ................. | 370/204 |
| 2005/0286477 A1 * | 12/2005 | Gupta et al. ................... | 370/338 |
| 2006/0092868 A1 * | 5/2006 | Meier ........................... | 370/312 |
| 2006/0114878 A1 * | 6/2006 | Choe et al. .................... | 370/346 |
| 2006/0126497 A1 * | 6/2006 | Na et al. ........................ | 370/216 |
| 2006/0256805 A1 * | 11/2006 | Cho et al. ...................... | 370/431 |
| 2007/0110091 A1 * | 5/2007 | Kwon ............................ | 370/445 |
| 2009/0073880 A1 * | 3/2009 | Park et al. ..................... | 370/235 |
| 2010/0135319 A1 * | 6/2010 | Wang et al. ................... | 370/445 |

* cited by examiner

*Primary Examiner* — Shaq Taha
(74) *Attorney, Agent, or Firm* — Kacvinsky Daisak Bluni PLLC

(57) ABSTRACT

Techniques for media access in wireless networks are disclosed. For instance, embodiments may provide a time interval for accessing a wireless communications channel. In addition, embodiments may prevent channel access during the time interval by stations incapable of employing a first channel access technique. This access technique employs an access probability P.

11 Claims, 6 Drawing Sheets

POWER-EFFICIENT MEDIA ACCESS TECHNIQUES FOR WIRELESS NETWORKS

BACKGROUND

Wireless communications capabilities are increasingly being integrated into portable devices, including laptop computers, handheld devices (such as personal digital assistants (PDAs)), and mobile phones. The integration of such capabilities can provide users with anywhere and anytime connectivity to information resources.

Power consumption is a key feature for such devices. For instance, lower power consumption levels correspond to increased operational times between battery charging sessions. As a result of this, a device user's experience may be enhanced.

Wireless networks may employ media access techniques that are based on carrier sensing. For example, networks provided by the Institute for Electrical and Electronics Engineers (IEEE) 802.11 standards may use carrier sense multiple access with collision avoidance (CSMA/CA). In CSMA/CA, a device desiring to transmit first "listens" to a channel. By listening, the device determines whether the channel is "idle" or "busy". If the device determines that the channel is idle, then it may send its transmission. However, if the device determines that the channel is busy, then it defers its transmission.

Unfortunately carrier sensing techniques, such as those used to perform CSMA/CA, are not power-efficient.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for media access in wireless networks. For instance, embodiments may provide a time interval for accessing a wireless communications channel. In addition, embodiments may prevent channel access during the time interval by stations incapable of employing a first channel access technique. This access technique employs an access probability P. More particularly, the manner in which a station transmits is based on this probability.

Through the employment of such techniques, reductions in power consumption may be advantageously achieved.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
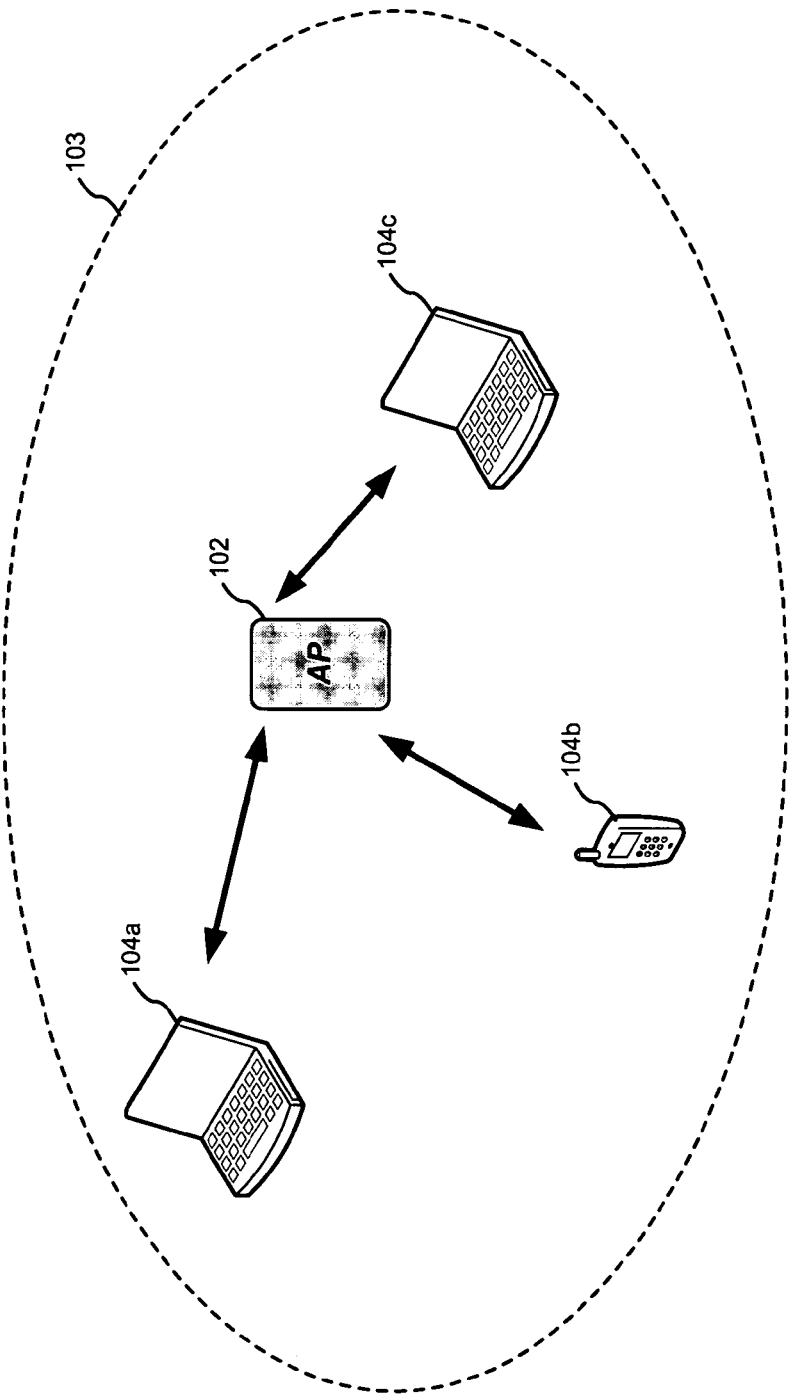
FIG. 1 is a diagram of an exemplary operational environment.

FIG. 1 is a diagram of an exemplary operational environment 100 in which the techniques disclosed herein may be employed. This environment includes various devices. More particularly, FIG. 1 shows an access point (AP) 102, and multiple stations (STAs) 104$a$-$c$. Together, these devices form a network 103. Operations of this network may be based on one or more IEEE 802.11 standards. However, embodiments are not limited to this context.

Each of STAs 104$a$-$c$ communicates wirelessly with AP 102. In turn, AP 102 operates as a bridge among STAs 104$a$-$c$, as well as an interface between STAs 104$a$-$c$ and devices outside of network 103. In the context of IEEE 802.11, network 103 is referred to as a basic service set (BSS).

As described above, embodiments provide managed contention access (MCA) techniques, which may advantageously increase power efficiency. Each of STAs 104$a$-$c$ may be either a legacy station or an MCA-capable station. MCA-capable stations are able to recognize MCA-specific signaling and information. In contrast, legacy stations are not capable of recognizing any MCA-specific signaling and information.

Figure 2:
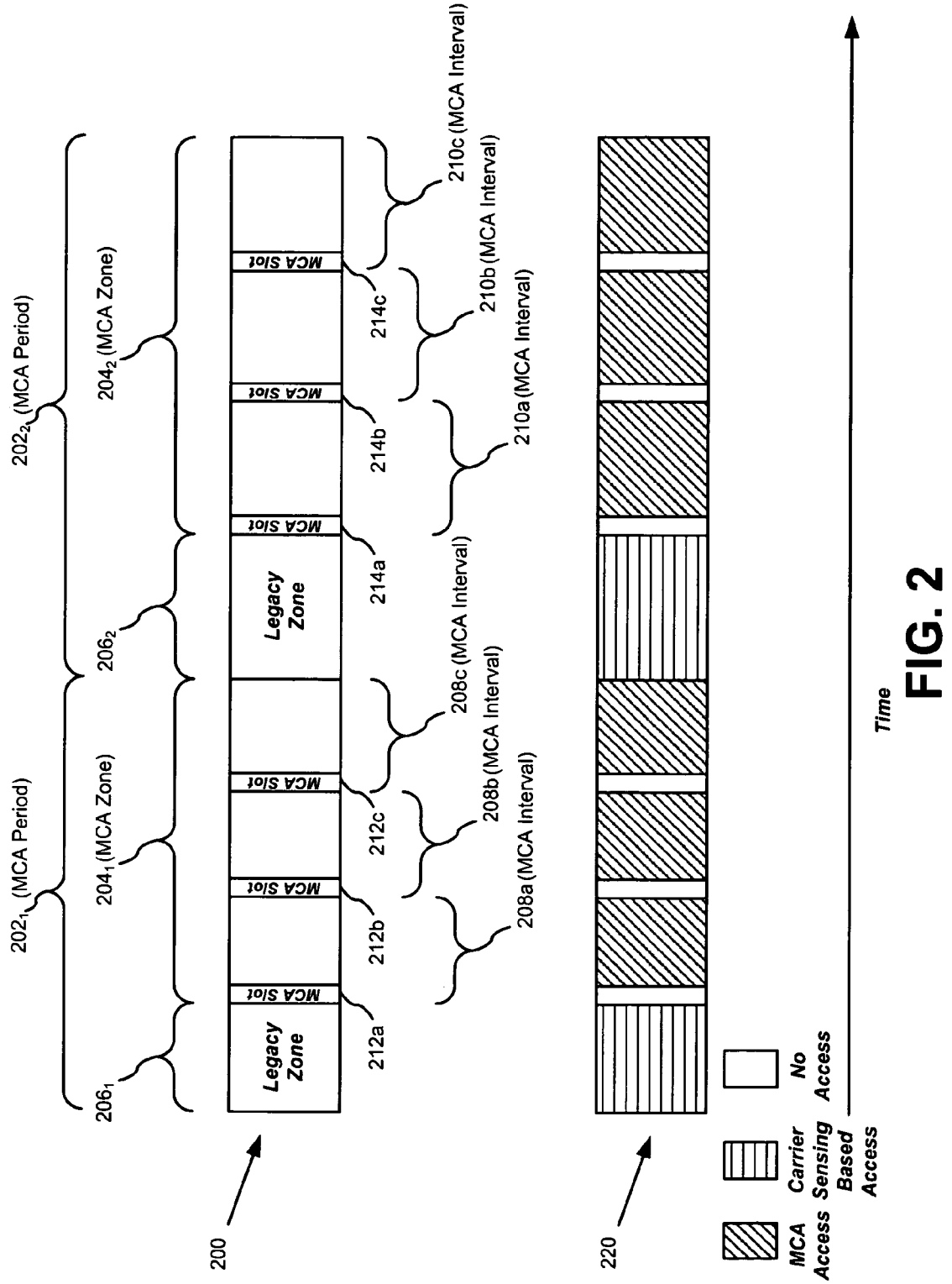
FIG. 2 is a diagram showing an exemplary timing format.

FIG. 2 is a diagram showing an exemplary timing format 200 that allocates the resources of a communications channel (e.g., a wireless radio frequency channel). This format provides for the employment of MCA techniques.

This format divides time into consecutive MCA periods. For instance, FIG. 2 shows a first MCA period $202_1$ and a second MCA period $202_2$. In embodiments, first MCA period may begin at a predetermined time after the beginning of a beacon interval (e.g., an IEEE 802.11 beacon interval).

Two zones exist within each of these MCA periods: an MCA zone, and a legacy zone. For instance, MCA period $202_1$ includes an MCA zone $204_1$, and a legacy zone $206_1$. Similarly, MCA period $202_2$ includes an MCA zone $204_2$, and a legacy zone $206_2$.

FIG. 2 shows that each MCA zone is further divided into multiple MCA intervals of equal duration. For instance, MCA zone $204_1$ includes MCA intervals 208$a$, 208$b$, and 208$c$. Likewise, MCA zone $204_2$ includes MCA intervals 210$a$, 210$b$, and 210$c$.

Each of these MCA intervals begins with an MCA slot. In particular, FIG. 2 shows that MCA intervals 208$a$, 208$b$, and 208$c$ begin with MCA slots 212$a$, 212$b$, and 212$c$, respectively. Similarly, MCA intervals 210$a$, 210$b$, and 210$c$ begin with MCA slots 214$a$, 214$b$, and 214$c$, respectively.

By providing distinct legacy zones and MCA zones, the activities of MCA-capable stations and legacy stations may be separated. More particularly, during legacy zones, a legacy STA may access the channel through media access control techniques that are based on carrier sensing. Such techniques may include, for example, media access control in accordance with the IEEE 802.11 distributed coordination function (DCF) (which employs CSMA/CA). In embodiments, MCA-capable STAs may also access the channel during legacy zones by using such carrier sensing based techniques.

However, during MCA zones, only MCA-capable STAs may access the channel through the employment of an MCA access technique. This technique may include non carrier sensing approaches or/and carrier sensing based approaches.

In addition, FIG. 2 shows an access diagram 220 that is aligned with timing format 200. This diagram shows when particular access techniques are allowed. In particular, access diagram 220 shows that carrier sensing (e.g., DCF access) is permitted during legacy zones. In contrast, the MCA access technique is permitted the MCA zones. However, in embodiments, no access is allowed during MCA slots. Thus, the MCA slots operate as guard intervals to provide reliable operation in the event of any synchronization errors. (excluding the MCA slots).

Various parameters are associated with the timing format of FIG. 2. In embodiments, an access point may periodically provide stations with such parameters. For example, an access point may deliver parameters in beacons and/or access frames. Exemplary parameters are listed and described in Table 1, below.

TABLE 1

| Parameter | Description |
| --- | --- |
| $T_I$ | The employed MCA interval duration |
| $T_S$ | The employed MCA slot duration |
| $T_p$ | The employed MCA period time duration |
| P | The MCA access probability |
| N | The number of MCA intervals per MCA period |
| $T_{start}$ | The starting time of the first MCA interval, measured as the offset to the beginning of a beacon interval |

The parameters of Table 1 may take on various values. In embodiments, such values may be based on an IEEE 802.11 time unit (TU), which is 1024 microseconds (a beacon interval is usually 100 TUs). More particularly, the TU may be used as a granularity for adjusting such parameters (e.g., $T_I$, $T_p$, N, $T_S$, P, $T_{start}$). In embodiments, an access point may dynamically adjust parameters with such a granularity based on factors, such as network conditions.

With respect to the setting of parameters, longer MCA slots may provide greater resistance to inaccurate clocking by stations. However, increases in MCA slot durations cause reductions in time available for carrier sensing based access (e.g., DCF usage). On the other hand, the MCA usage is determined by the number and duration of MCA intervals. Hence, embodiments may set $T_S$ as small as possible. For example, in IEEE 802.11 based networks, $T_S$ may be set to the slot time (e.g. 9 microseconds for 802.11a).

The parameters of Table 1 are provided for purposes of illustration, and not limitation. Accordingly other additional or alternative parameters may be employed. Moreover, the timing format of FIG. 2 is provided as an example. Thus, other formats may be employed. Also, any number of legacy zones and MCA zones may be included in beacon intervals. Further, MCA zones may include any number of MCA intervals.

Figure 3:
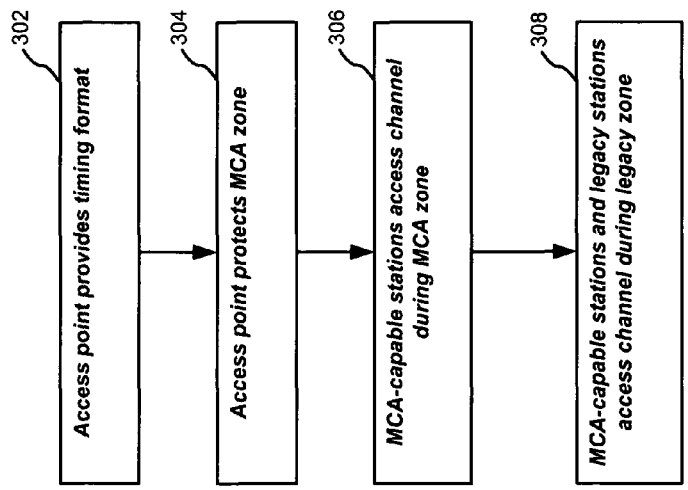
FIG. 3 is a flow diagram showing exemplary network operations.

FIG. 3 illustrates an embodiment of a logic flow. In particular, FIG. 3 illustrates a logic flow 300, which may be representative of the operations executed by one or more embodiments described herein. Although FIG. 3 shows a particular sequence, other sequences may be employed. Also, the depicted operations may be performed in various parallel and/or sequential combinations.

The flow of FIG. 3 involves a media access in a network. Operations of this network may be based on one or more IEEE 802.11 standards. However, embodiments are not limited to this context. This network includes an access point, one or more legacy stations, and one or more MCA-capable stations. Accordingly, the flow of FIG. 3 may be employed in the network of FIG. 1. Embodiments, however, are not limited to this context.

At a block 302, the access point provides a timing format for channel access by both MCA-capable stations and legacy stations. This timing format includes one or more time intervals. Such time interval(s) may include a first interval for a first access technique (e.g., an MCA technique), and a second interval for a second access technique (e.g., CSMA/CA) With reference to FIG. 2, these first and second time interval may be an MCA zone, and a legacy zone respectively. However, embodiments are not limited to the timing format of FIG. 2.

Thus, block 302 may comprise the access point sending initialization information to the stations (both legacy stations and MCA-capable stations) in the network. This initialization information may include $T_I$, $T_p$, N, $T_S$, P, and $T_{start}$. However, other combinations of information bay be sent. The access point may distribute this information through beacon transmission(s) and/or through one or more management frames.

At a block 304, the access point protects an MCA zone. In other words, the access point prevents the legacy stations from transmitting during the MCA zone. This may involve sending one or more transmissions that instruct the legacy stations to not transmit during the MCA zone. In the context of IEEE 802.11 networks, this may include a CTS-to-self message. This message reserves the medium until the end of the MCA zone. In embodiments, the channel access for this CTS-to-self message shall start early enough to accommodate the longest transmission opportunity (TXOP) employed in the network.

In addition, protecting the MCA zone may involve the access point indicating to the MCA-capable stations that the MCA zone is available for transmission. For instance, as described above, the access point may transmit a CTS-to-self message that reserves the MCA zone. To release this zone for the MCA-capable stations, the access point may subsequently send a transmission that provides this feature. For example, embodiments provide a new control frame called MCA-Allowed. The MCA-Allowed control frame may be sent with a short interframe spacing (SIFS) delay after the CTS-to-self message is sent.

As the MCA-Allowed control frame is new, it is not recognizable by the legacy stations. Therefore, the legacy stations will continue to comply with the previously sent CTS-to self message. However, the MCA-capable stations will recognize this new control frame. Thus, the MCA-capable stations will be able to access the channel during the MCA zone.

At a block 306, the MCA-capable stations may access the channel during the MCA-zone. This channel access is in accordance with an MCA access technique. Moreover, in accordance with this technique, any transmission of MCA-capable stations has to complete before the beginning of the MCA slot in the nearest future.

This technique provides three channel access options. More particularly, an MCA zone provides the following three channel access options depending on the value of P, (i.e. whether 0<P<1, P=0, or P=1). As described above, P is provided by the access point at block 302.

According to the first option (0<P<1), an MCA-capable station attempts to access the channel (i.e., transmit) during the MCA zone according to a probability-based technique. In particular, the MCA-capable station randomly generates a number, X. In embodiments, this number may be generated in accordance with a random variable that is uniformly distributed between 0 and 1.

If X is less than P (the MCA access probability), then the MCA-capable station may start transmitting within the MCA zone (right after the MCA slot) without conducting any carrier sensing. Otherwise, if X is greater than or equal to P, the MCA-capable station must use the carrier sensing based approach (e.g., DCF) to access the channel. Once any resulting contention-based transmissions are complete and there is sufficient time remaining in the MCA interval, an MCA-capable station may employ the carrier sensing based approach (e.g., DCF) to access the channel.

As described above, P may be provided to the MCA capable station at block 302. In embodiments, P may be set to zero (the second option). This effectively disables contention for channel access right after the end of each MCA slot. Thus, when this setting is employed, the access point may send out a poll frame right after the MCA slot to request one or more individual stations to transmit. Once any resulting polling transmissions are complete and there is sufficient time remaining in the MCA interval, an MCA-capable station may employ the carrier sensing based approach (e.g., DCF) to access the channel.

According to the third option (P=1), an MCA-capable STA may employ DCF immediately after each MCA slot, and the last channel busy time should be set to the end of the MCA slot. As described above, DCF involves channel access through CSMA/CA.

At a block 308, the both the MCA-capable stations and the legacy stations may access the channel during a legacy zone. More particularly, both of these station types employ DCF during the legacy zone.

Thus, the flow of FIG. 3 demonstrates channel access techniques that are available to stations during various portions of MCA zones and legacy zones. Table 2, below, provides a summary of these techniques.

TABLE 2

|  | MCA Zone | Legacy Zone |
| --- | --- | --- |
| Legacy Station | No channel access | Carrier sensing based access |
| MCA-capable Station | MCA access | Carrier sensing based access |

As indicated above, MCA-capable stations do not necessarily sample the communications medium (e.g., perform carrier sensing) during MCA interval. Instead, through the employment of probability-based access techniques, such stations may simply "wake up" and transmit (when X is less than P). Thus, MCA zone transmissions from two or more stations may collide.

In embodiments, the access point may determine parameters to yield a chosen probability of collision. Such parameters may include (but are not limited to) the number of MCA slots within an MCA zone and the probability P. The access point may determine such parameters based on various factors. Exemplary factors include network conditions, such as the number of MCA-capable stations in the access point's network, traffic patterns associated with such MCA-capable stations, and so forth. The traffic patterns of the MCA-capable stations may be established with a modified IEEE 802.11e TSPEC exchange. From such traffic patterns, collision statistics for various parameters may be ascertained. More particularly, such collision statistics should reflect collision statistics of the slotted-aloha protocol.

Figure 4:
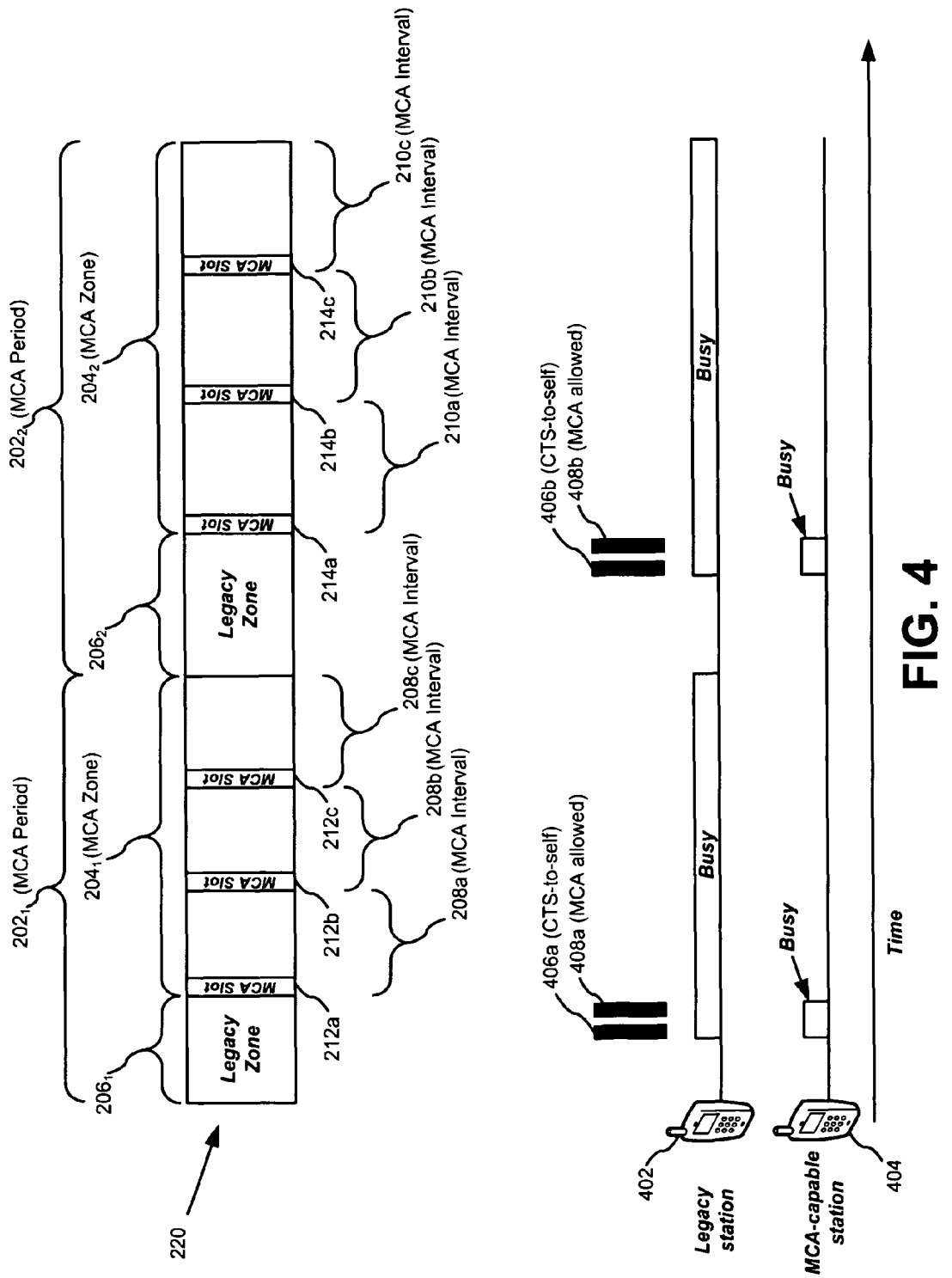
FIG. 4 is a diagram showing the protection of managed contention access zones.

FIG. 4 is a diagram showing MCA zones of FIG. 2 being protected. In particular, this diagram shows messages sent from an access point (not shown). Further, this diagram shows the effect of these messages on a legacy station 402, and on an MCA-capable station 404.

As shown in FIG. 4, prior to MCA zone $204_1$, the access point sends a CTS-to-self message 406a, and an MCA allowed message 408a. As shown in FIG. 4, legacy station 402 then considers the channel busy from this point until the beginning of legacy zone $206_2$. However, from the perspective of MCA-capable station 404, the channel is merely busy during the reception of these messages. Similarly, prior to MCA zone $204_2$, the access point sends a CTS-to-self message 406b, and an MCA allowed message 408b. In turn, legacy station considers the channel busy throughout MCA zone $204_2$, while MCA-capable station 404 merely considers the channel busy during the reception of these messages.

Figure 5:
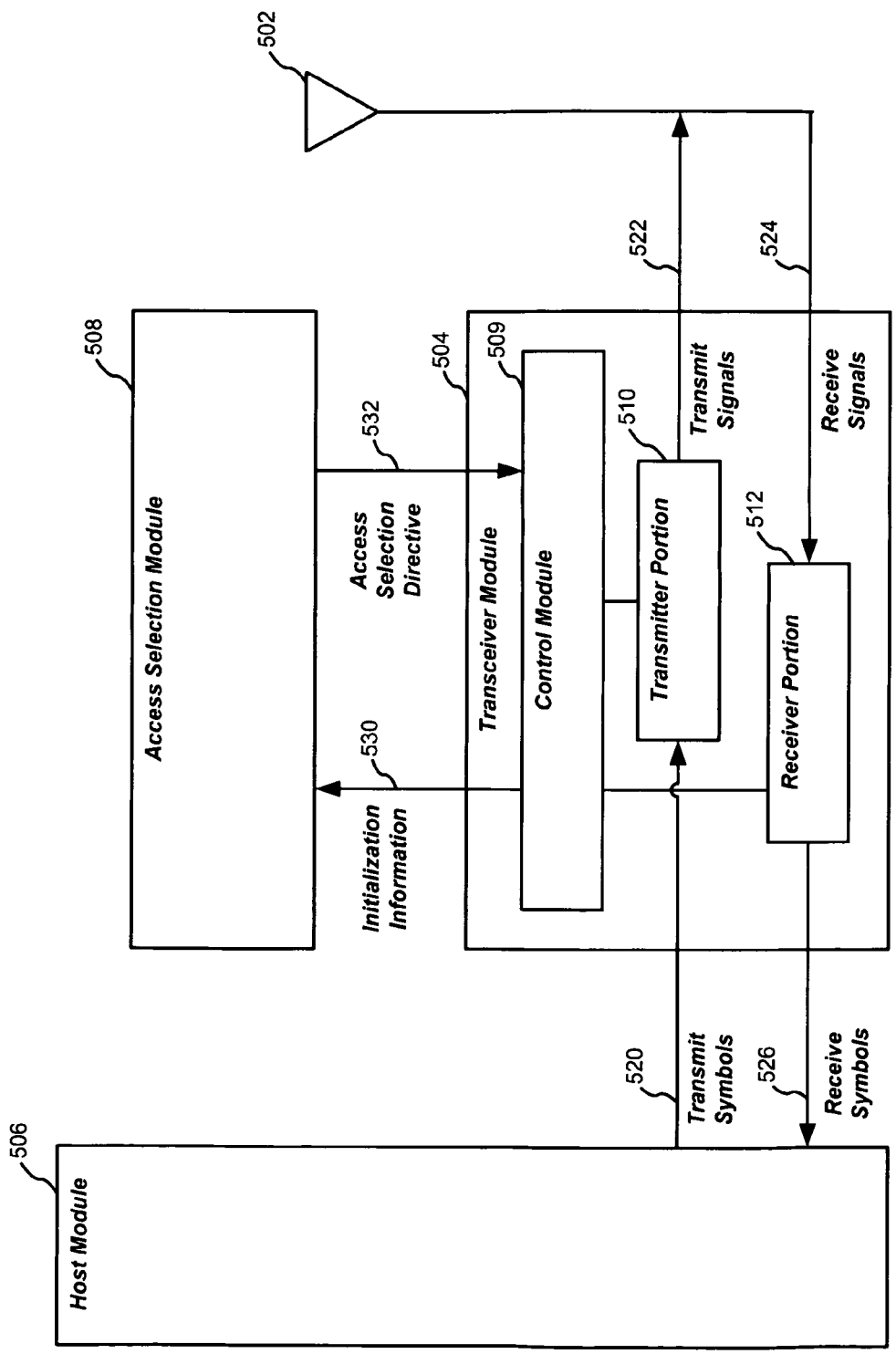
FIG. 5 is a diagram of an exemplary station implementation.

FIG. 5 is a diagram of an implementation 500 that may be included in an MCA-capable station. However, this implementation may be also employed in other contexts. Implementation 500 may include various elements. For example, FIG. 5 shows implementation 500 including an antenna 502, a transceiver module 504, a host module 506, and an access selection module 508. These elements may be implemented in hardware, software, or any combination thereof.

Antenna 502 provides for the exchange of wireless signals with remote devices. Although a single antenna is depicted, multiple antennas may be employed. For example, embodiments may employ one or more transmit antennas and one or more receive antennas. Alternatively or additionally, embodiments may employ multiple antennas for beamforming, and/or phased-array antenna arrangements.

As shown in FIG. 5, transceiver module 504 includes a control module 509, a transmitter portion 510, and a receiver portion 512. During operation, transceiver module 504 provides an interface between antenna 502 and host module 506. For instance, transmitter portion 510 receives symbols 520 from host module 506, and generates corresponding signals 522 for wireless transmission by antenna module 502. This may involve operations, such as modulation, amplification, and/or filtering. However, other operations may be employed.

Conversely, receiver portion 512 obtains signals 524 received by antenna 502 and generates corresponding symbols 526. In turn, transceiver module 504 provides symbols 526 to host module 506. This generation of symbols 526 may involve operations, including (but not limited to) demodulation, amplification, and/or filtering.

Signals 522 and 524 may be in various formats. For instance, these signals may be formatted for transmission in IEEE 802.11 networks. However, embodiments are not limited to these exemplary networks.

To provide such features, transmitter portion 510 and receiver portion 512 may each include various components, such as modulators, demodulators, amplifiers, filters, buffers, upconverters, and/or downconverters. Such components may be implemented in hardware (e.g., electronics), software, or any combination thereof.

The symbols exchanged between host module 506 and transceiver module 504 may form messages or information associated with one or more protocols, and/or with one or more user applications. Thus, host module 506 may perform operations corresponding to such protocol(s) and/or user application(s). Exemplary protocols include various media access control, network, transport and/or session layer protocols. Exemplary user applications include telephony, messaging, e-mail, web browsing, content (e.g., video and audio) distribution/reception, and so forth.

Moreover, in transmitting signals 522, transceiver module 504 may employ various access techniques. For example, transceiver module 504 may employ a first channel access technique (e.g., an MCA technique). Alternatively, transceiver module 504 may employ a second channel access technique that includes carrier sensing. In embodiments, the first channel access technique may be the probability-based access technique described herein, and the second channel access technique may be CSMA/CA (e.g., DCF). Embodiments, however, are not limited to these techniques. In embodiments, selection among such techniques is performed by access selection module 508. Details regarding such selections are provided below.

In addition to operating as an interface between host module 506 and antenna 502, transceiver module 504 may perform various signaling, link control, and media access operations. For instance, transceiver module 504 may exchange (via antenna 502) information with remote devices. Such information may include beacons, control frames, signaling messages, and so forth.

As described above, transceiver module 504 includes a control module 509. This module manages various operations of transceiver module 504. For example, control module 509 manages the employment of various media access techniques. FIG. 5 shows that control module 509 is coupled to transmitter portion 510 and receiver portion 512. Accordingly, control module 509 may coordinate or perform operations, such as carrier sensing and the reception of media access parameters. In embodiments, such operations may involve both transmitter portion 510 and receiver portion 512.

FIG. 5 shows that control module 509 sends initialization information 530 to access selection module 508. This initialization information is originated by a remote access point and received by receiver portion 512 (via antenna 502). As described above (e.g., with reference to block 302 of FIG. 3), this initialization information may include parameters, such as timing information, access probability P, as well as other information.

Upon receipt of initialization information 530, access selection module 508 may establish synchronization with its corresponding timing format. Through this synchronization, access selection module 508 determines when transceiver module 504 may employ particular access techniques. As shown in FIG. 5, access determination module 508 sends an access selection directive 532 to control module 509.

This directive indicates which access technique may be employed by transceiver module 504. For example, in the context of FIG. 2, directive 532 may indicate a non-carrier sensing based access technique during MCA intervals.

Figure 6:
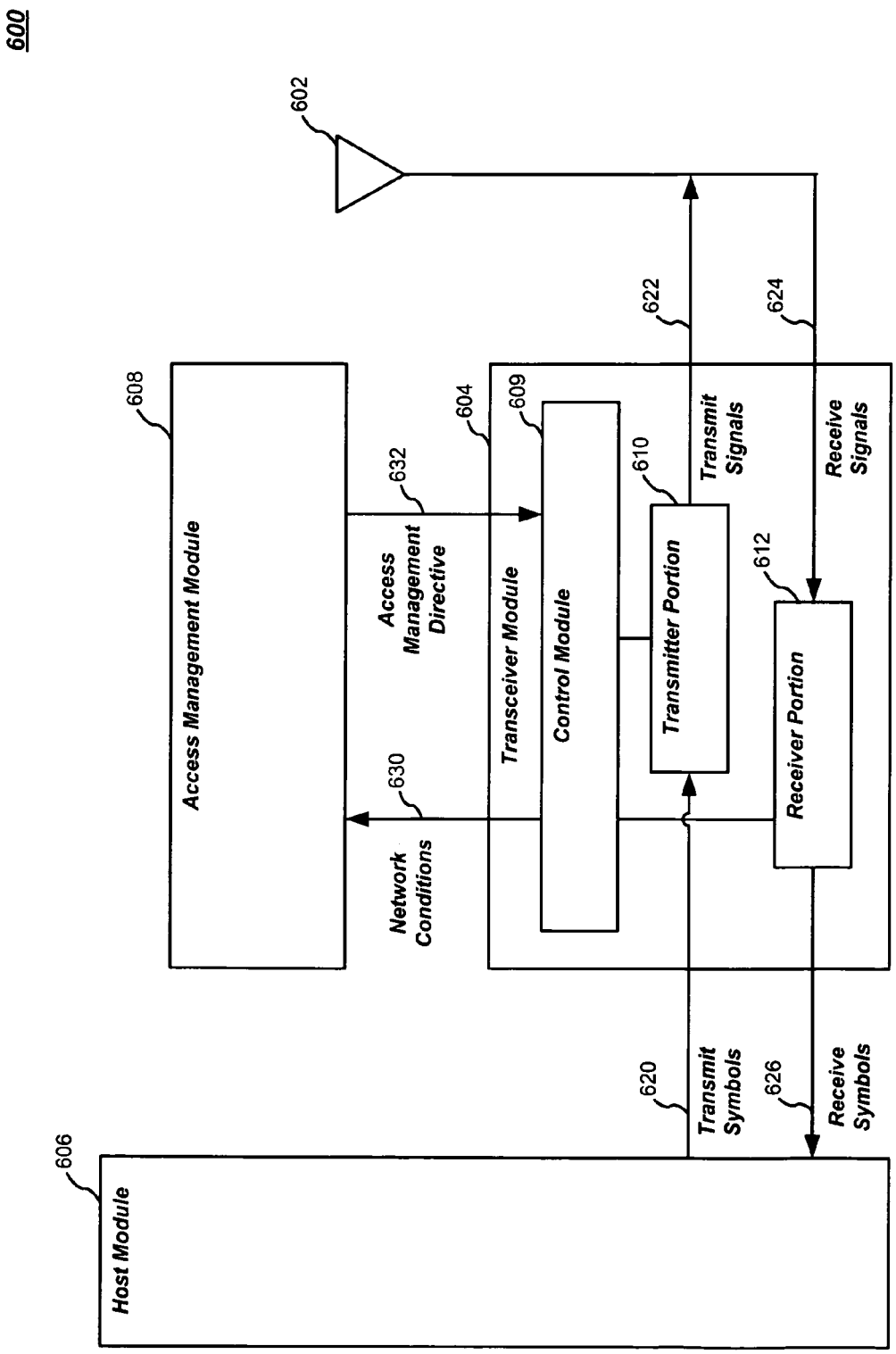
FIG. 6 is a diagram of an exemplary access point implementation.

FIG. 6 is a diagram of an implementation 600 that may be included in an access point. However, this implementation may be also employed in other contexts. Implementation 600 may include various elements. For example, FIG. 6 shows implementation 600 including an antenna 602, a transceiver module 604, a host module 606, and an access management module 608. These elements may be implemented in hardware, software, or any combination thereof.

Antenna 602 provides for the exchange of wireless signals with remote devices. Although a single antenna is depicted, multiple antennas may be employed. For example, embodiments may employ one or more transmit antennas and one or more receive antennas. Alternatively or additionally, embodiments may employ multiple antennas for beamforming, and/or phased-array antenna arrangements.

As shown in FIG. 6, transceiver module 604 includes a control module 609, a transmitter portion 610, and a receiver portion 612. Transmitter portion 610 and receiver portion 612 may operate in manner similar to transmitter portion 510 and receiver portion 512 of FIG. 5.

For instance, FIG. 6 shows transmitter portion 610 receiving symbols 620 from host module 606 and generating corresponding signals 622 for wireless transmission by antenna module 602. Conversely, receiver portion 612 obtains signals 624 received by antenna 602 and generates corresponding symbols 626, which are provided to host module 606. In performing these operations, features described above with reference to FIG. 5 may be employed.

In addition, transmitter portion 610 may generate signals 622 based on messages provided by control module 609. Such messages may correspond to transmissions that establish media access characteristics. Details regarding this feature are provided below.

Signals 622 and 624 may be in various formats. For instance, these signals may be formatted for transmission in IEEE 802.11 networks. However, embodiments are not limited to these exemplary networks.

The symbols exchanged between host module 606 and transceiver module 604 may form messages or information associated with one or more protocols, and/or with one or more user applications. Thus, host module 606 may perform operations corresponding to such protocol(s) and/or user application(s). Exemplary protocols and user applications are described above with reference to FIG. 5. In addition, host module 606 may provide an interface to outside networks for the wireless stations.

Access management module 608 determines various media access characteristics to be employed in a wireless network. For instance, access management module 608 determines a timing format, such as the timing format of FIG. 2. As described herein, this timing format may include one or more time intervals, each interval having one or more first portions for a first channel access technique (e.g., a non-carrier sensing based technique), and one or more second portions for a second channel access technique (e.g., a carrier sensing based technique). With reference to FIG. 2, these time interval(s) may be an MCA zone(s). However, embodiments are not limited to the timing format of FIG. 2.

Also, access management module 608 may determine one or more further access parameters. For example, access management module 608 may determine the access probability P. In embodiments, however, access management module 608 may determine additional or alternative parameters.

The timing format and/or access parameter(s) may be determined based on one or more network conditions. As described herein, such conditions may include traffic patterns of stations (e.g., MCA-capable stations and/or legacy stations). Access management module 608 may obtain data regarding such patterns through the monitoring of wireless transmissions exchanged by transceiver module 604. In FIG. 6, this feature is shown as network conditions 630 being indicated to access management module 608.

Based on the above determinations, access management module 608 sends transceiver module 604 an access management directive 632. In turn, transceiver module 604 generates corresponding transmissions, which are sent (e.g., broadcast) to receiving stations. For instance, control module 609 of transceiver module 604 generates messages (e.g., beacons, access frames, and so forth) that include information, (such as the parameters of Table 1) for stations (e.g., MCA-capable stations) to operate in accordance with the access characteristics determined by access management module 608. In turn, transmitter portion 610 generates corresponding signals 624 that are wirelessly transmitted via antenna 602.

The implementations of FIGS. 5 and 6 are provided for purposes of illustration, and not limitation. Thus other implementations may be employed. For instance, implementations may include combinations of features of FIGS. 5 and 6.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to IEEE 802.11 networks.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
providing a time interval for accessing a wireless communications channel;
preventing channel access during the time interval by stations incapable of employing a first channel access technique, wherein the first channel access technique comprises a non-carrier sensing technique, wherein said preventing channel access comprises:
sending a first transmission to reserve the channel during the time interval; and
sending a second transmission to release the channel during the time interval, the second transmission comprising a control frame that is not recognizable by stations incapable of employing the first channel access technique; and
sending a first message to instruct a first station capable of employing the first channel access technique to employ the first channel access technique during a first subinterval of the time interval, wherein any transmission of the first station has to complete before start of a second subinterval of the time interval.

2. The method of claim 1, further comprising:
providing a further time interval for a carrier sensing technique.

3. The method of claim 1, comprising sending a second message to instruct a second station capable of employing the first channel access technique to employ a carrier sensing technique during a second subinterval of the time interval, based on a comparison of a randomly generated value for the second station with an access probability P, wherein the carrier sensing technique comprises carrier sense multiple access with collision avoidance (CSMA/CA).

4. The method of claim 3, further comprising transmitting initialization information, the initialization information, comprising P.

5. The method of claim 4, further comprising determining P based on one or more network conditions.

6. The method of claim 1, further comprising determining one or more characteristics of the time interval.

7. The method of claim 6, wherein the one or more characteristics of the time interval are determined based on one or more network conditions.

8. An apparatus, comprising:
an access management module to determine a time interval for accessing a wireless communications channel, the access management module operative on a transceiver to:
send one or more transmissions to protect the time interval from access by stations incapable of employing a first channel access technique, wherein the first channel access technique comprises a non-carrier sensing technique, wherein the one or more transmissions include:
a first transmission to reserve the channel during the time interval; and
a second transmission to release the channel during the time interval, the second transmission comprising a control frame that is not recognizable by stations incapable of employing the first channel access technique; and
send a first message to instruct a first station capable of employing the first channel access technique to employ the first channel access technique during a first subinterval of the time interval, wherein any transmission of the first station has to complete before start of a second subinterval of the time interval.

9. The apparatus of claim 8, the access management module operative on a transceiver to send a second message to instruct a second station capable of employing the first channel access technique to employ a second channel access technique during a second subinterval of the time interval, based on a comparison of a randomly generated value for the second station with an access probability P, wherein the access management module is to determine one or more characteristics of the time interval and P, the determination based on one or more network conditions.

10. An article comprising a machine-accessible non-transitory medium having stored thereon instructions that, when executed by a machine, cause the machine to:
provide a time interval for accessing a wireless communications channel;

prevent channel access during the time interval by stations incapable of employing a first channel access technique, wherein the first channel access technique comprises a non-carrier sensing technique, wherein said preventing channel access comprises:
   sending a first transmission to reserve the channel during the time interval; and
   sending a second transmission to release the channel during the time interval, the second transmission comprising a control frame that is not recognizable by stations incapable of employing the first channel access technique; and
send a first message to instruct a first station capable of employing the first channel access technique to employ the first channel access technique during a first subinterval of the time interval, wherein any transmission of the first station has to complete before start of a second subinterval of the time interval.

11. The article of claim 10, comprising instructions that, when executed by a machine, cause the machine to send a second message to instruct a second station capable of employing the first channel access technique to not employ the first channel access technique and to employ a second channel access technique during a second subinterval of the time interval, wherein the second channel access technique comprises carrier sense multiple access with collision avoidance (CSMA/CA).

* * * * *